(12) United States Patent
Khalil et al.

(10) Patent No.: US 10,012,118 B2
(45) Date of Patent: Jul. 3, 2018

(54) FILTER WITH DUAL PLEAT PACK

(71) Applicant: Filtran LLC, Des Plaines, IL (US)

(72) Inventors: Ibrahim Khalil, Lake Barrington, IL (US); Vasyl Kondratyuk, Arlington Heights, IL (US)

(73) Assignee: FILTRAN LLC, Des Plaines, IL (US)

( * ) Notice: Subject to any disclaimer, the term of this patent is extended or adjusted under 35 U.S.C. 154(b) by 452 days.

(21) Appl. No.: 14/600,553

(22) Filed: Jan. 20, 2015

(65) Prior Publication Data

US 2015/0129469 A1    May 14, 2015

Related U.S. Application Data

(63) Continuation-in-part of application No. 13/755,134, filed on Jan. 31, 2013, and a continuation-in-part of
(Continued)

(51) Int. Cl.

| | |
|---|---|
| *B01D 29/07* | (2006.01) |
| *B01D 29/56* | (2006.01) |
| *B01D 29/52* | (2006.01) |
| *B01D 35/30* | (2006.01) |
| *B01D 29/01* | (2006.01) |
| *F01M 11/03* | (2006.01) |

(52) U.S. Cl.
CPC ........... *F01M 11/03* (2013.01); *B01D 29/012* (2013.01); *B01D 29/07* (2013.01); *B01D 29/52* (2013.01); *B01D 29/56* (2013.01); *B01D 35/303* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 4,863,602 A | * | 9/1989 | Johnson ................. | B01D 29/11 210/484 |
| 4,904,397 A | | 2/1990 | Eimer et al. | |

(Continued)

FOREIGN PATENT DOCUMENTS

| | | |
|---|---|---|
| DE | 20006981 | 7/2000 |
| EP | 1733775 | 12/2006 |

(Continued)

OTHER PUBLICATIONS

Search Report from related EPO Appln. No. 15165371.4 dated Jul. 14, 2015.
(Continued)

*Primary Examiner* — Krishnan S Menon
*Assistant Examiner* — Bradley R Spies
(74) *Attorney, Agent, or Firm* — Grossman, Tucker, Perreault & Pfleger, PLLC

(57) ABSTRACT

A fluid filter apparatus comprising an upper housing shell; a lower housing shell; a pleat pack element comprising a peripheral frame and a folded pleated media. The frame is at least partially molded over the media to secure the media in the frame, and the media comprises two or more types of media of different densities from each other. A flow control element is disposed for changing the proportion of flow between the first media and the second media responsive to changes in at least one of temperature, pressure, flow rate and/or viscosity of the fluid.

17 Claims, 18 Drawing Sheets

Related U.S. Application Data application No. 13/755,154, filed on Jan. 31, 2013, now abandoned.

(56) References Cited

U.S. PATENT DOCUMENTS

| | | | |
|---|---|---|---|
| 4,976,858 | A | 12/1990 | Kadoya |
| 5,397,632 | A | 3/1995 | Murphy, Jr. et al. |
| 6,416,570 | B2 | 7/2002 | Goto et al. |
| 7,845,500 | B2 | 12/2010 | Hueppchen et al. |
| 7,875,171 | B2 | 1/2011 | Pekarsky et al. |
| 8,246,819 | B2 | 8/2012 | Sakata et al. |
| 9,004,291 | B2 | 4/2015 | Saito et al. |
| 9,084,950 | B2 | 7/2015 | Saito et al. |
| 2003/0094405 | A1* | 5/2003 | Stamey, Jr. ............ B01D 29/05 210/85 |
| 2004/0144716 | A1 | 7/2004 | Kobayashi et al. |
| 2005/0230324 | A1 | 10/2005 | Peet et al. |
| 2006/0169632 | A1 | 8/2006 | Suzuki et al. |
| 2006/0180541 | A1* | 8/2006 | Hueppchen ........ B01D 35/0273 210/450 |
| 2007/0151906 | A1 | 7/2007 | Beer et al. |
| 2007/0256399 | A1* | 11/2007 | Yang .................... B01D 46/444 55/418 |
| 2008/0290013 | A1 | 11/2008 | Stausberg et al. |
| 2010/0162988 | A1* | 7/2010 | Enokida ............. F01M 11/0004 123/195 C |
| 2011/0174704 | A1* | 7/2011 | Yamada ................ B01D 29/01 210/137 |
| 2011/0259810 | A1 | 10/2011 | Sakata et al. |
| 2013/0008845 | A1 | 1/2013 | Saito et al. |
| 2013/0118964 | A1* | 5/2013 | Dedering ............... B01D 35/06 210/167.04 |
| 2013/0146526 | A1 | 6/2013 | Saito et al. |
| 2015/0265950 | A1 | 9/2015 | Norris et al. |

FOREIGN PATENT DOCUMENTS

| | | |
|---|---|---|
| FR | 2989444 | 10/2013 |
| JP | 58-189015 | 11/1983 |
| JP | 63-141618 | 9/1988 |
| JP | 64-43324 | 2/1989 |
| JP | 4-915 | 1/1992 |
| JP | 2000-079718 | 10/2000 |
| JP | 2001120937 | 5/2001 |
| JP | 2003-042272 | 2/2003 |
| JP | 2004-363783 | 12/2004 |
| JP | 2006-316902 | 11/2006 |
| JP | 2007-327413 | 12/2007 |

OTHER PUBLICATIONS

Office Action from related Korean Appln. No. 10-2015-0064017 dated Jun. 24, 2016. English translation attached.
International Search Report and Written Opinion from related PCT Appln. No. PCT/US14/13919 dated Apr. 3, 2014.
International Search Report and Written Opinion from related PCT Appln. No. PCT/US14/13910 dated Apr. 3, 2014.
Decision of Grant from related Korean Appln. No. 10-2015-0064017 dated Mar. 29, 2017.
Office Action from related Japanese Appln. No. 2015-556135, dated Nov. 6, 2017. English translation attached.

* cited by examiner

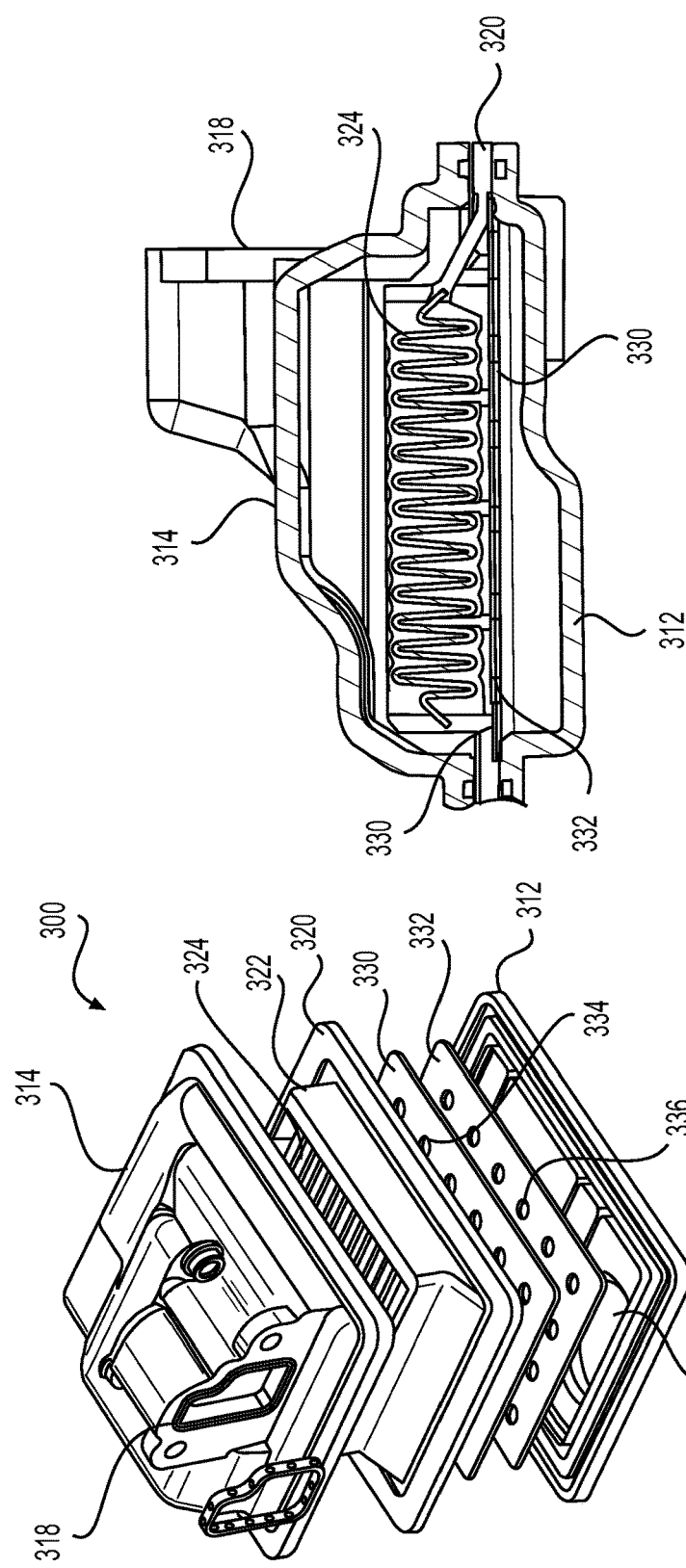

FILTER WITH DUAL PLEAT PACK

CROSS REFERENCE TO RELATED APPLICATIONS

This application is a continuation-in-part (CIP) of, and claims priority to U.S. patent application Ser. No. 13/755,134, filed Jan. 31, 2013 and pending, published as US 2014/0209528 A1, the entire disclosure of which is hereby incorporated by reference in its entirety.

This application is also a continuation-in-part (CIP) of, and claims priority to U.S. patent application Ser. No. 13/755,154, filed Jan. 31, 2013 and pending, published as US 2014/0209529 A1, the entire disclosure of which is hereby incorporated by reference in its entirety.

BACKGROUND

The invention relates generally to the field of filtration. More specifically, some embodiments of the invention relate to filters that are used to filter liquids such as engine oil or transmission oil in engines such as vehicle engines.

Various filtration devices are known. More specifically, filtration devices are known that are used in engine and/or vehicle applications, for example in the filtration of automotive transmission fluid. Some devices provide a housing forming a chamber containing a filtration media such as, for example, a felt type media that is permeable to the fluid but traps particles or other contaminants. A disadvantage to some of these filters is that they employ only one type of media, which in certain circumstances can cause difficulty of the fluid flow when the fluid is cold because the fluid tends to be highly viscous and not pass through the filtration media in the same fashion as is desired when the fluid is warm. Another disadvantage of some transmission filters is that the surface area of a flat sheet of media is less than may be desired within a compact housing shape. Yet another disadvantage of certain types of filters is that they may employ the filter media being mounted by being crimped directly between upper and lower housings in order to ensure a sufficient seal around the periphery between the two housings and also with the filter media.

Accordingly, it would be desirable to have a filter device and method that can overcome any or some of the above-mentioned disadvantages.

SUMMARY OF THE INVENTION

In light of the present need for filters such as transmission filters, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

In some aspects, a fluid filter apparatus comprises: an upper housing shell; a lower housing shell; a pleat pack element comprising a peripheral frame and a folded pleated media, wherein the frame is at least partially molded over at least some edges the media to secure the media in the frame, wherein the media comprises two types of media of different filtration densities from each other. A flow control element is disposed for changing the proportion of flow between the first media and the second media responsive to changes in at least one of temperature, pressure, flow rate, and/or viscosity of the fluid.

The foregoing objects and advantages of the invention are illustrative of those that can be achieved by the various exemplary embodiments and are not intended to be exhaustive or limiting of the possible advantages which can be realized. Thus, these and other objects and advantages of the various exemplary embodiments will be apparent from the description herein or can be learned from practicing the various exemplary embodiments, both as embodied herein or as modified in view of any variation that may be apparent to those skilled in the art. Accordingly, the present invention resides in the novel methods, arrangements, combinations, and improvements herein shown and described in various exemplary embodiments.

BRIEF DESCRIPTION OF THE DRAWINGS

In order to better understand various exemplary embodiments, reference is made to the accompanying drawings, wherein:

FIG. 12 is an exploded view of a filter according to a fourth preferred embodiment.

FIG. 13 is a cross-sectional view of the filter of FIG. 12.

DETAILED DESCRIPTION

Figure 1:
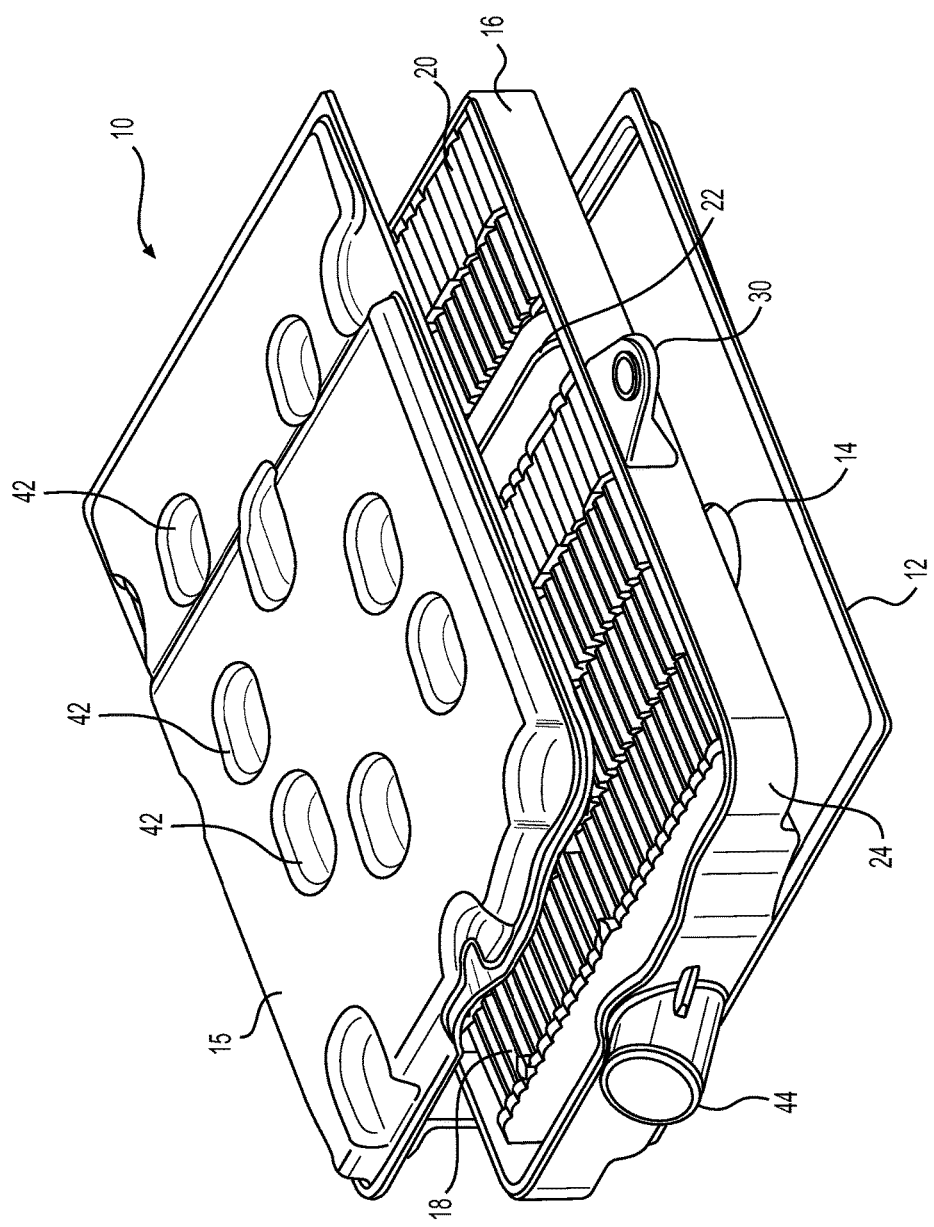
FIG. 1 is an exploded view of a filter according to a first preferred embodiment.

Some embodiments of the present invention relate to filters, such as automotive transmission fluid filters. Some embodiments will now be described with reference to the drawing figures in which like numbers generally designate like parts throughout.

Figure 2:
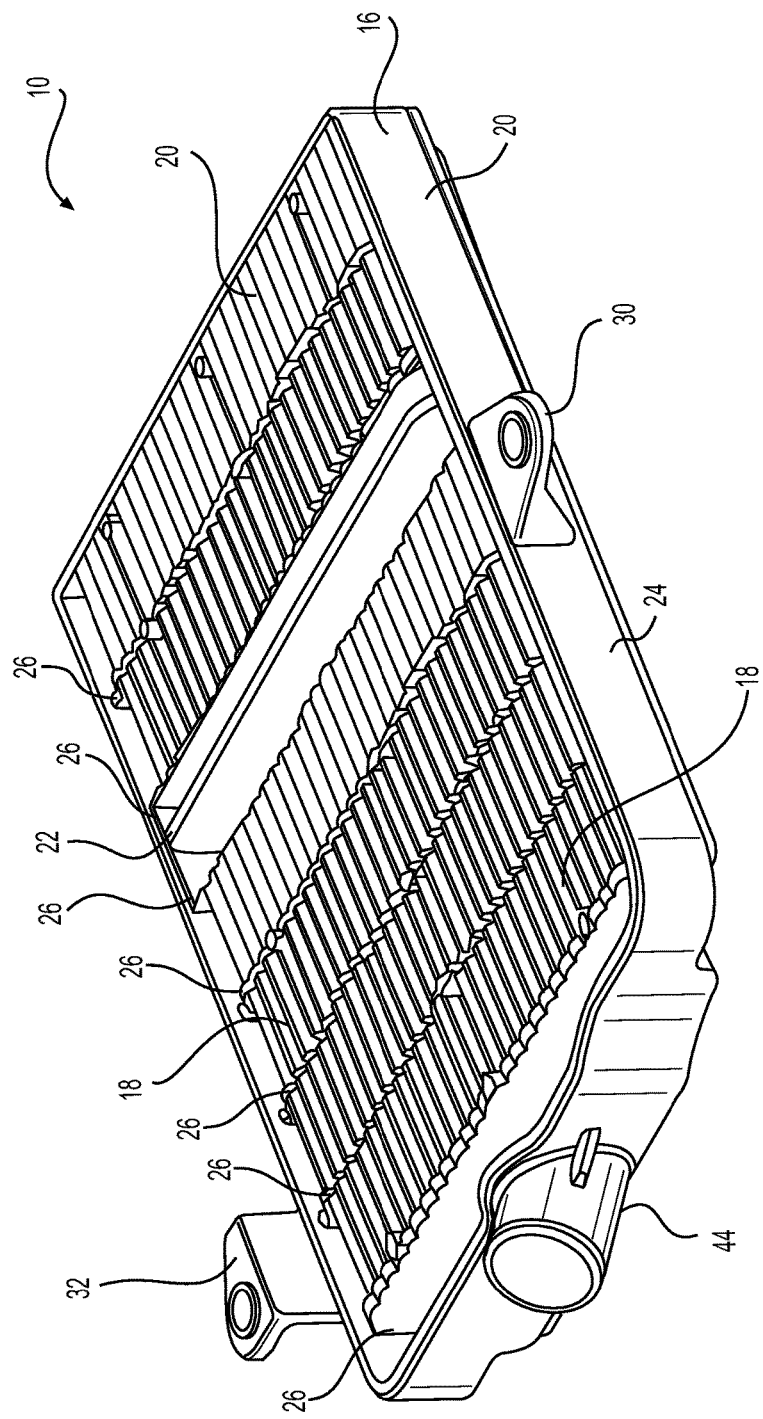
FIG. 2 is a top view of the filter pack of FIG. 1.
Figure 3:
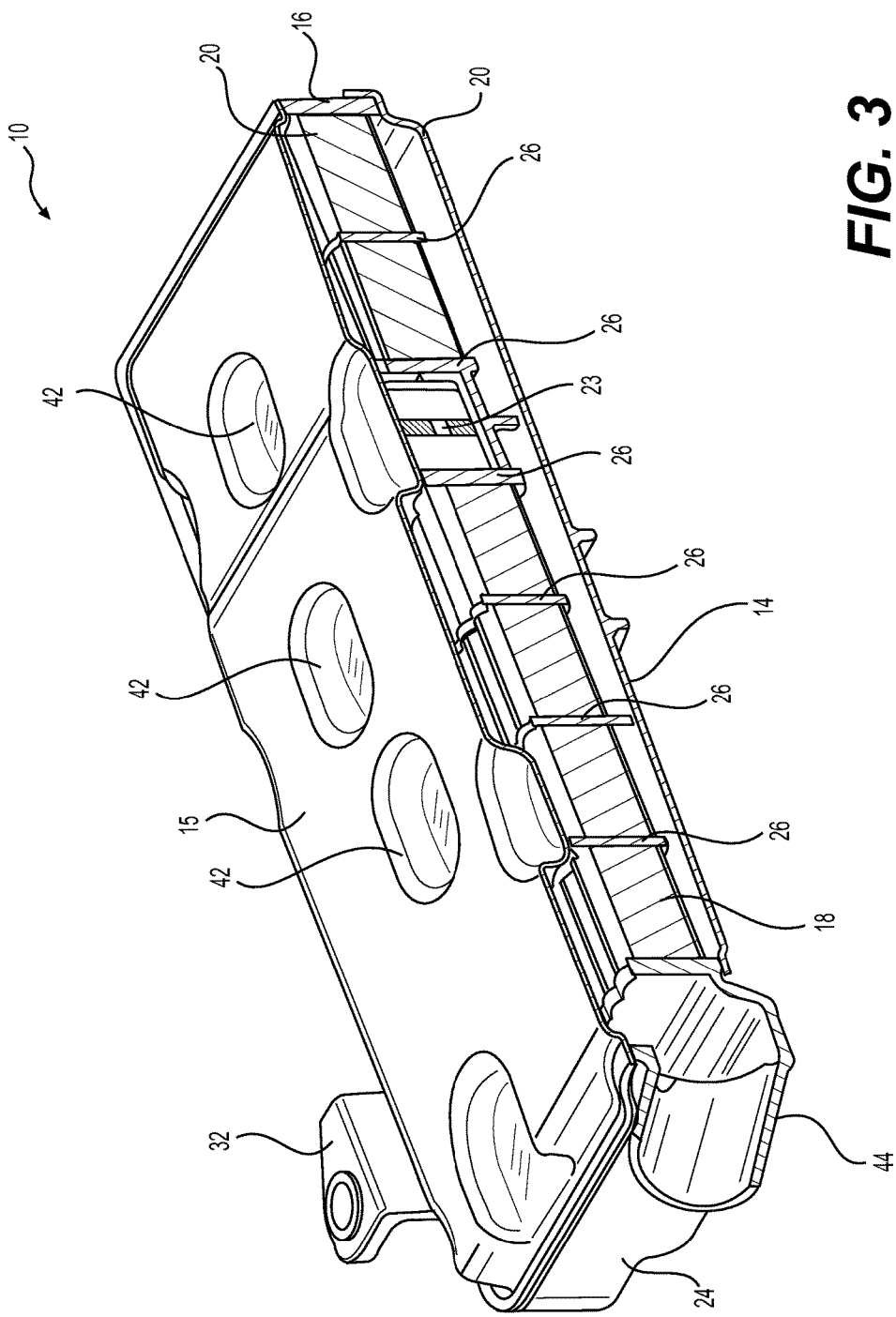
FIG. 3 is a cross-sectional view of the filter of FIG. 1.

FIG. 1 is an exploded view of a filter according to a first preferred embodiment. FIG. 2 is a top view of the filter pack of FIG. 1. FIG. 3 is a cross-sectional view of the filter of FIG. 1.

A filter 10 includes a lower cover 12 having a fluid inlet opening 14. An upper cover 15 is provided. A filter pack 16 has a pleated first media 18 and a pleated second media 20. The media are separated by a flow control element 22. The flow control element 22 determines (along with the types and surface area of media as described below) the amount of fluid that will flow through each of the various media sections, as a function of temperature, viscosity and/or fluid pressure as described in more detail below. In this example the element 22 is passive, it is rigid and does not change configuration based on fluid pressure differential of fluid flowing through the filter 10; yet the small gaps for fluid it provides do control the ratio of fluid flow through the first media 18 and second media 20. In this example the element 22 (which may also be considered as a flow-restriction plate) is a vertical wall or web with one oe more controlled sized permanent holes 23 as seen best in FIG. 3. The first media 18 and second media 20 can be any of a wide range of materials suitable for filtering the fluid such as for example vehicle transmission fluid. The media 18 and 20 can have different characteristics from each other such as for example density, efficiency and/or material type. The filter pack 16 has a surrounding housing portion 24 and transverse ribs 26, which may be integral with the housing portion 24. The media 18 and 20 can have the housing 24 and ribs 26 over-molded onto the media.

The housing 24 can be attached to the lower cover 12 and the upper cover 15 by one or more of vibration welding, laser welding, bonding, ultrasonic welding or infrared welding. The housing 24 can also have mounting bosses 30 and 32 for attachment of the filter 10 to a device such as a vehicle transmission. In this embodiment the lower cover 12 and upper cover 15 form a chamber that encloses the media types. The fluid outlet 44 is part of the housing 24. However, in other embodiments the fluid outlet 44 may be provided as an opening in the upper cover 15. Also, in other embodiments the lower cover 12 and upper cover 15 may be attached to each other and completely surround the pleat pack. The selection of the size, shape and total surface area of the holes in the element 22 affect the ratio of fluid flow between the two media. The selection of surface area of each media 18 and 20 will also be a factor in the relative flow amounts through each media in all embodiments. The top shell 15 may have stiffening and spacing dimples 42. The dimples 42 may also be arranged to correspond to bolt heads in the surrounding transmission components, this allowing a more compact mounting of the filter 10 adjacent the surrounding components. The housing 24 of the pack 16 also incorporates the fluid outlet 44. The top shell 15 and bottom shell 12 are attached, respectively, to the top and bottom of the housing portion 24 by suitable attachment, such as by one or more of vibration welding, laser welding, bonding, ultrasonic welding or infrared welding.

Figure 4:
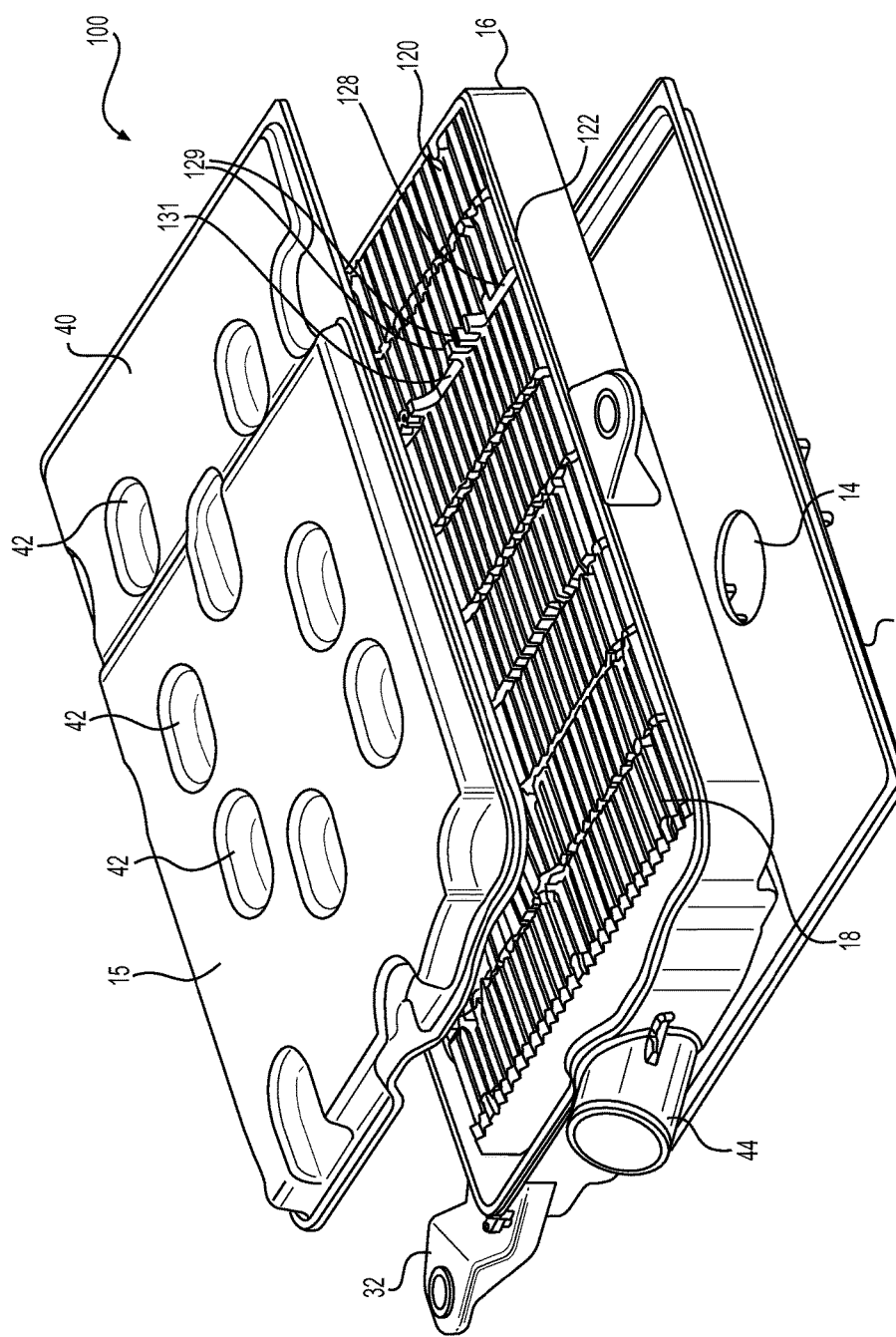
FIG. 4 is an exploded view of a filter according to a second preferred embodiment.
Figure 5:
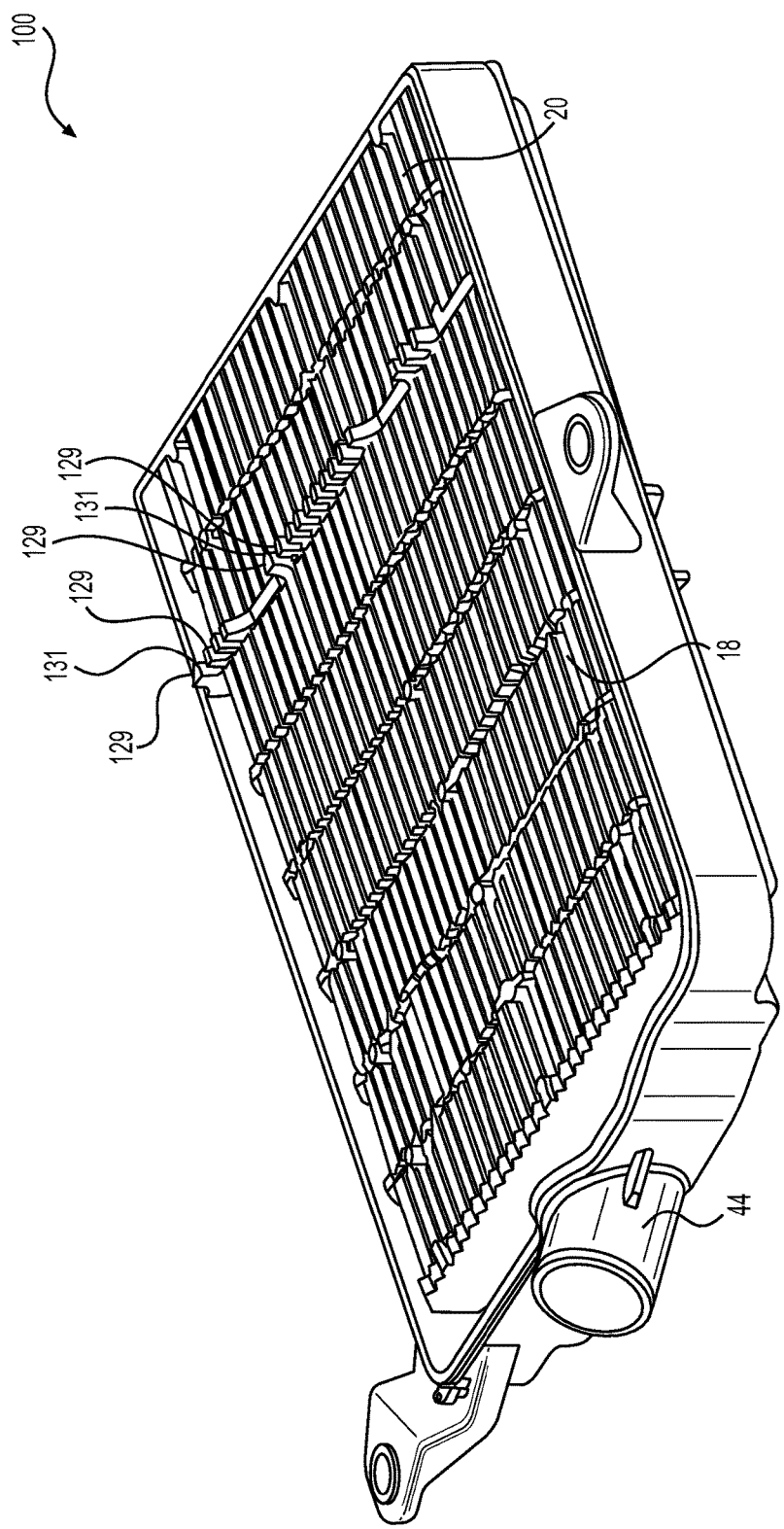
FIG. 5 is a top view of the filter pack of FIG. 4.
Figure 6:
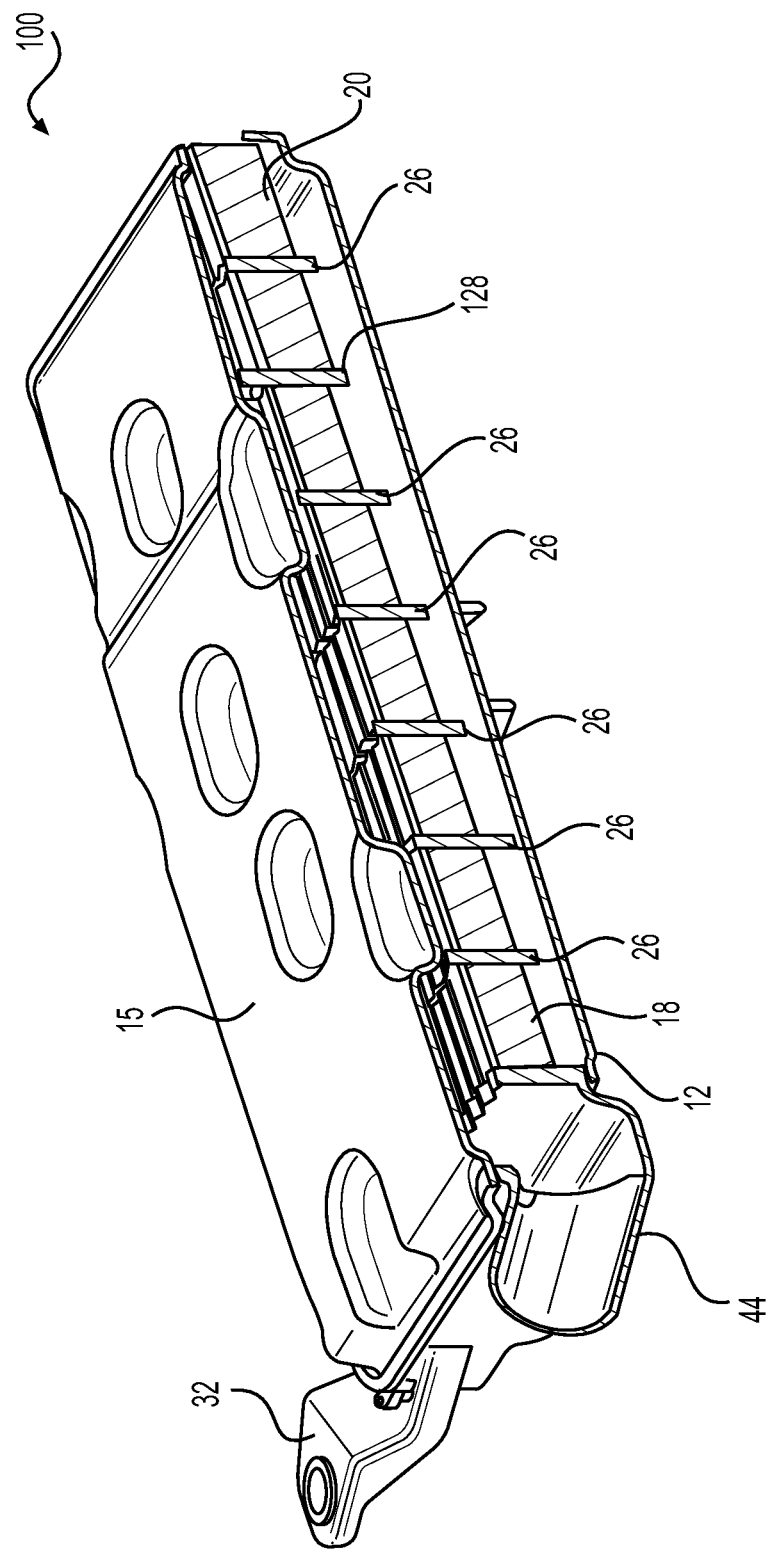
FIG. 6 is a cross-sectional view of the filter of FIG. 4.
Figure 7:
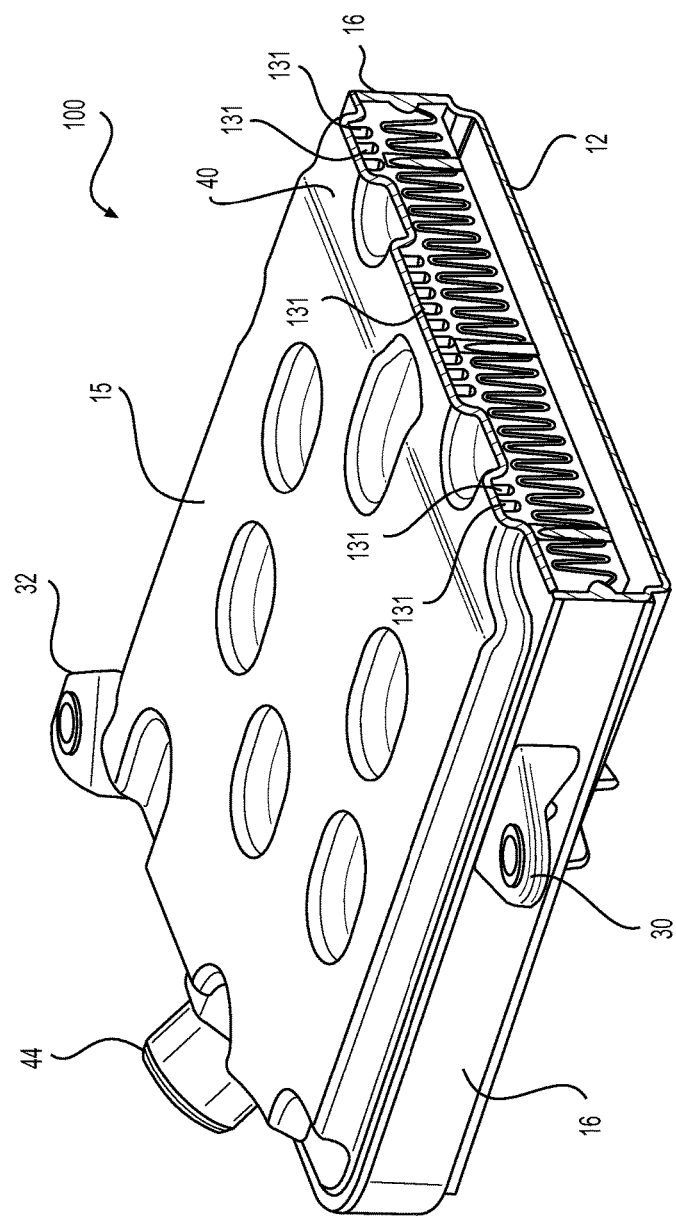
FIG. 7 is another cross-sectional view of the filter of FIG. 4.

FIG. 4 is an exploded view of a filter according to a second preferred embodiment, 100. FIG. 5 is a top view of the filter pack of FIG. 4. FIG. 6 is a cross-sectional view of the filter of FIG. 4. FIG. 7 is another cross-sectional view of the filter of FIG. 4. In this embodiment, like parts are labeled the same as in the first embodiment and are similar to those of the first embodiment. In this embodiment the "flow control element" is a flow restriction plate that is also passive, or immovable, similar to the element 22 of the first embodiment. The flow control element is integrated with a particular stiffening rib 128. The rib 128 has passive flow control apertures 131. The flow control apertures 131 can be slots or gaps in a the rib 128, which may be for example in the shape of a comb having upwardly projecting fingers 129 that may contact the underside of the upper shell 40. Aside from the fingers 129, fluid can flow over the top of the rib 128, i.e. through apertures 131. In this way the fingers partially define a gap for fluid, which gap is also partially defined by the inner surface of the top shell 40. The amount of flow will depend on the viscosity of the fluid, and be greater with low temperature, high viscosity, fluid in cases where the media 20 is coarser or less efficient than the media 18. Selection of the area of the flow control apertures 131 as defined between the fingers 129 (their width and number) allows a selection of the degree of flow balance between the first media 18 and the second media 20.

Figure 8:
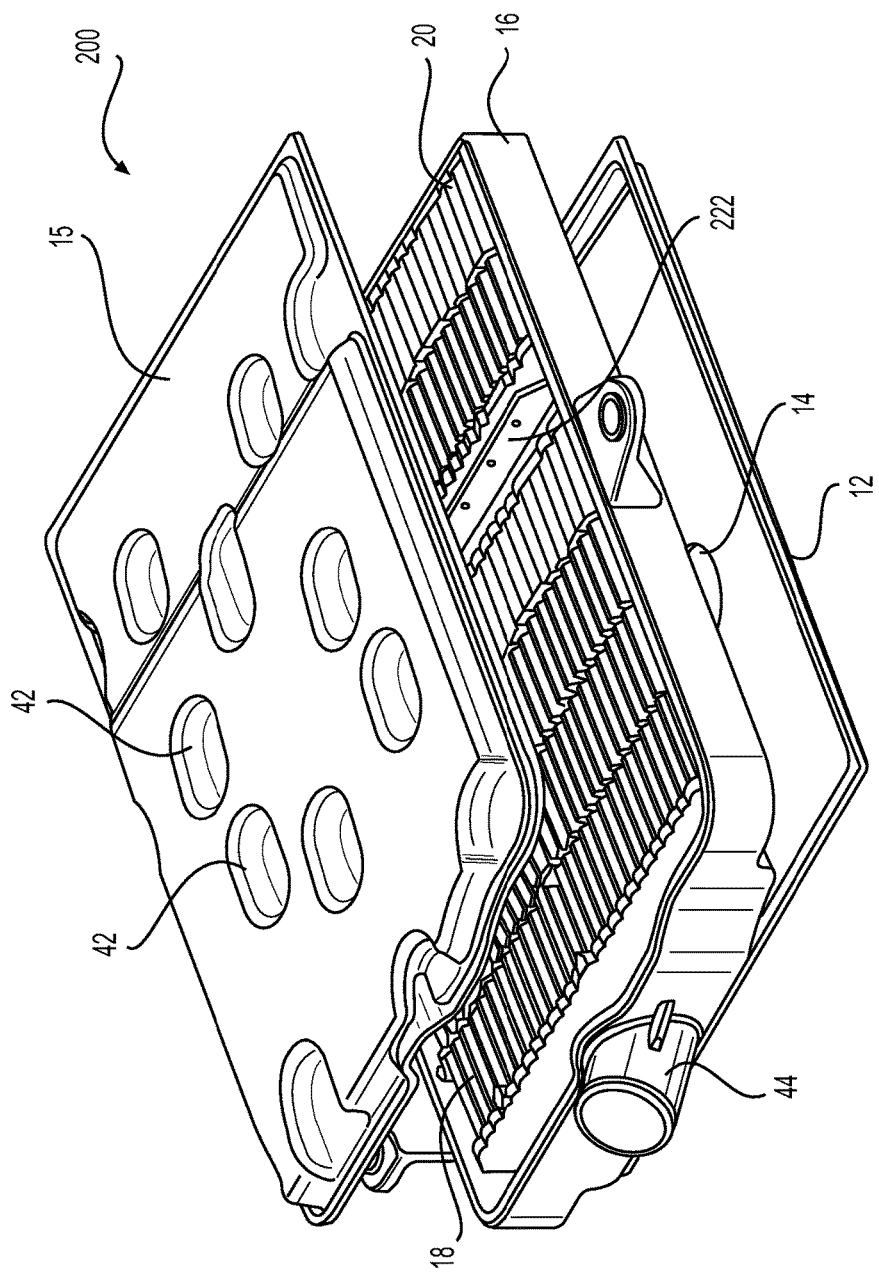
FIG. 8 is an exploded view of a filter according to a third preferred embodiment.
Figure 9:
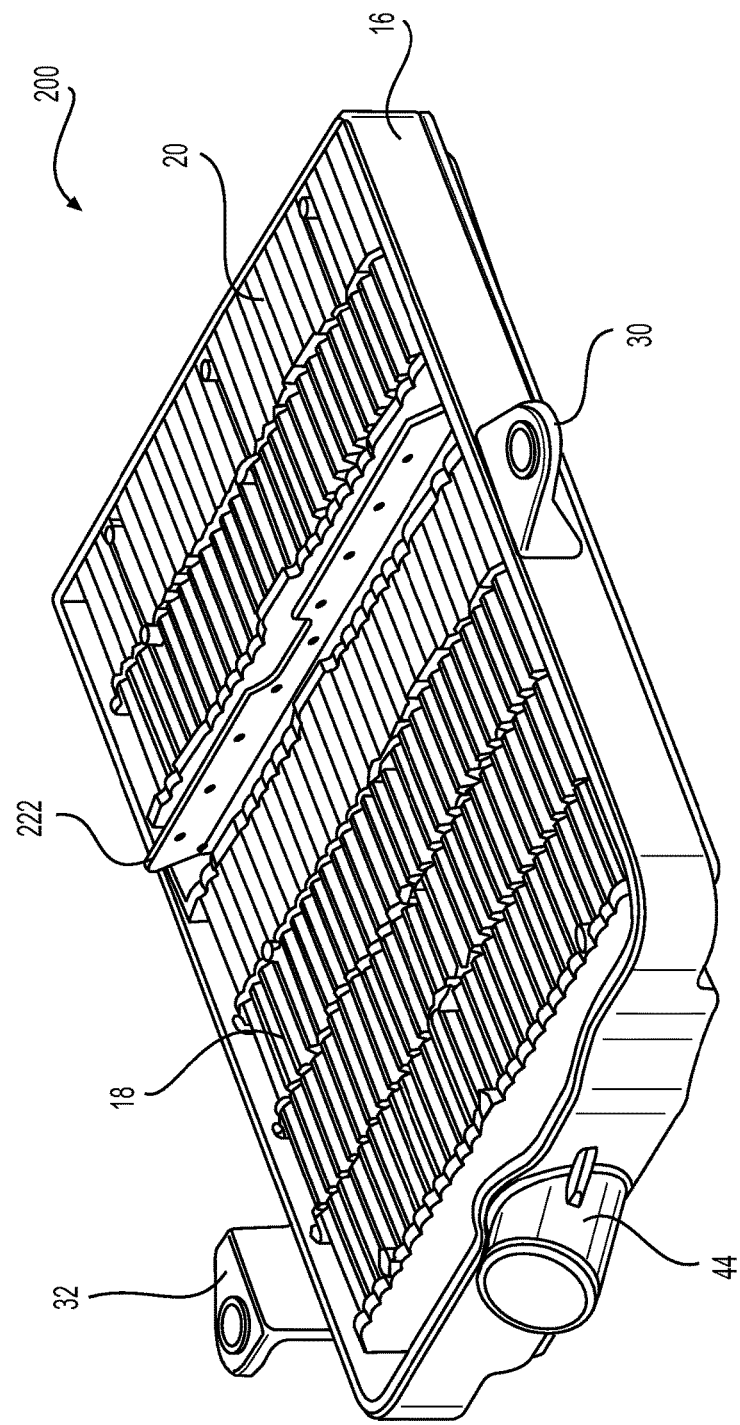
FIG. 9 is a top view of the filter pack of FIG. 8.
Figure 10:
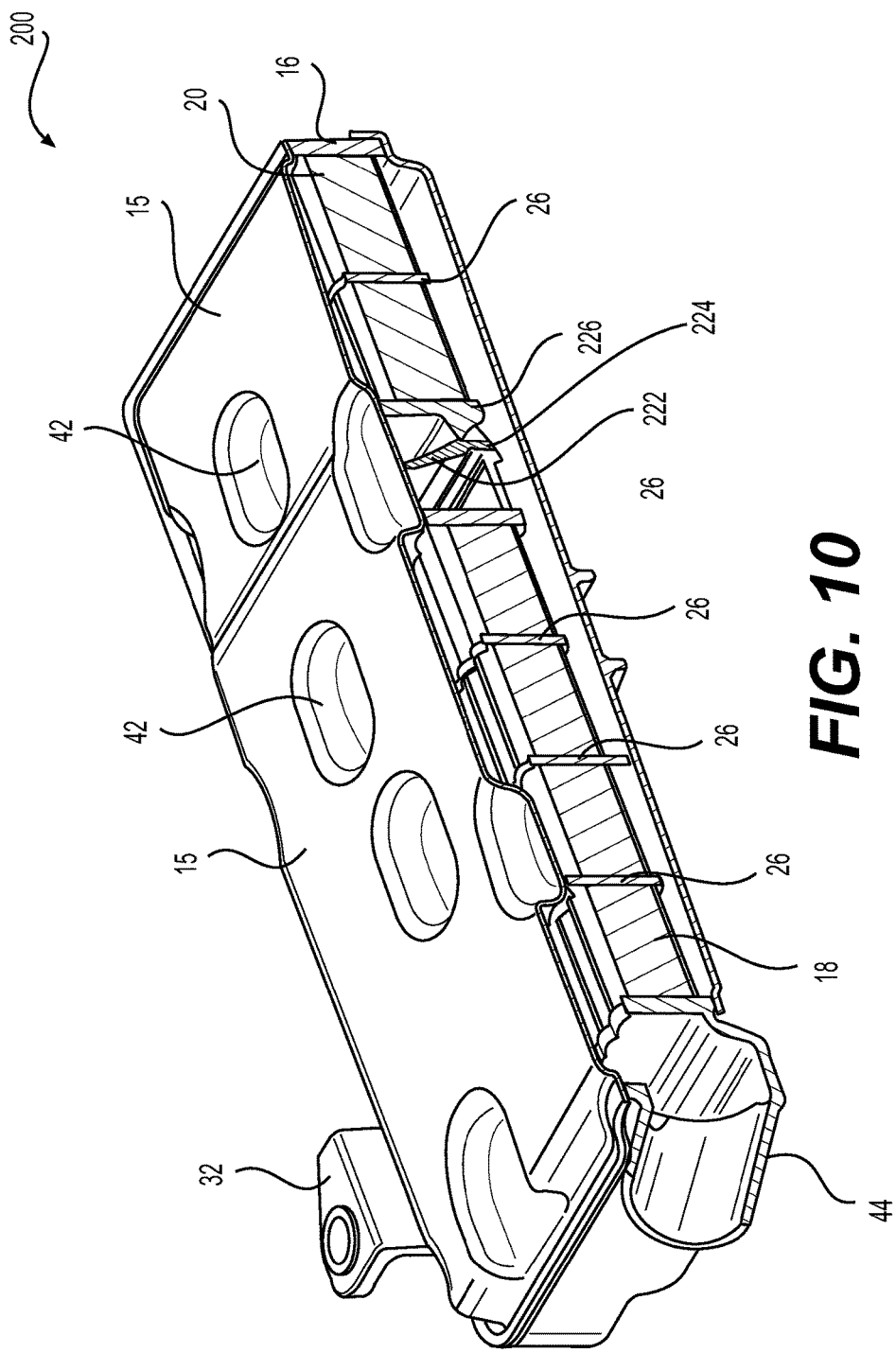
FIG. 10 is a cross-sectional view of the filter of FIG. 8.
Figure 11:
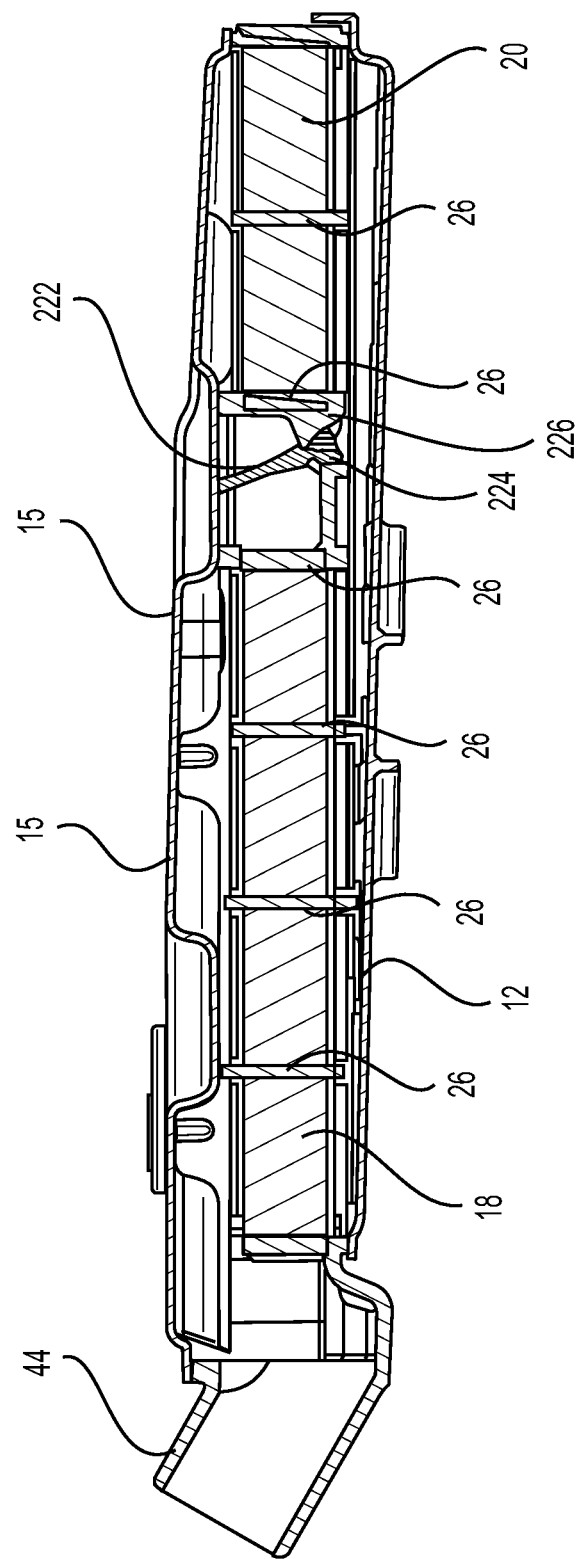
FIG. 11 is another cross-sectional view of the filter of FIG. 8.

FIG. 8 is an exploded view of a filter according to a third preferred embodiment, 200. FIG. 9 is a top view of the filter pack of FIG. 8. FIG. 10 is a cross-sectional view of the filter of FIG. 8. FIG. 11 is another cross-sectional view of the filter of FIG. 8. In this embodiment, like parts are labeled the same as in the first embodiment and are similar to those of the first embodiment. However, in this embodiment the "flow control element" is a valve 222 that is semi-active in that its upper regions flex or move by deflecting. In this embodiment, the valve 222 is a resilient flexible member which may be elastomeric. The valve 222 may be an elastomeric component with an internal stiffening insert of steel that is overmolded onto the elastomeric material. As seen in FIGS. 10 and 11, the valve can a have lower lobe 224 that seals in a groove in the mounting location 226 of the housing 24. The amount of flow will depend on the viscosity of the fluid, and be greater with low temperature, high viscosity, fluid in cases where the media 20 is coarser or less efficient that the media 18. The flow balance between the first media 18 and the second media 20 is affected by factors such as the stiffness of the material of the valve 222, the cross section shape of the valve 222, and the temperature of the fluid.

FIG. 12 is an exploded view of a filter according to a fourth preferred embodiment, 300. FIG. 13 is a cross-sectional view of the filter of FIG. 12. The filter 300 has a lower shell 312 and an upper shell 314. The lower shell has a fluid inlet 316, and the upper shell has a fluid outlet 318. A pleat pack 322 has a surrounding housing 320 overmolded onto a media region 324. The media region 324 may have one or more media types, either with or without a valve as described above. The lower shell 312, upper shell 314 and pleat pack 320 are attached together as described above. The filter includes at least one other sheet type media, shown as 330 and 332, which span the housing. In this example the sheet media 330 and 332 are located in the flow path before the pleated media 324. The sheet media 330 and 332 may be of different characteristics from the pleated media 324, and from each other. The sheet media 330 and 332 may also have holes or apertures 334, 336 therethrough, which form a bypass for fluid, and they may be of lower or higher density or efficiency than the pleated media region 324. The apertures 334, 336 can be overlapping or non-overlapping.

Figure 14:
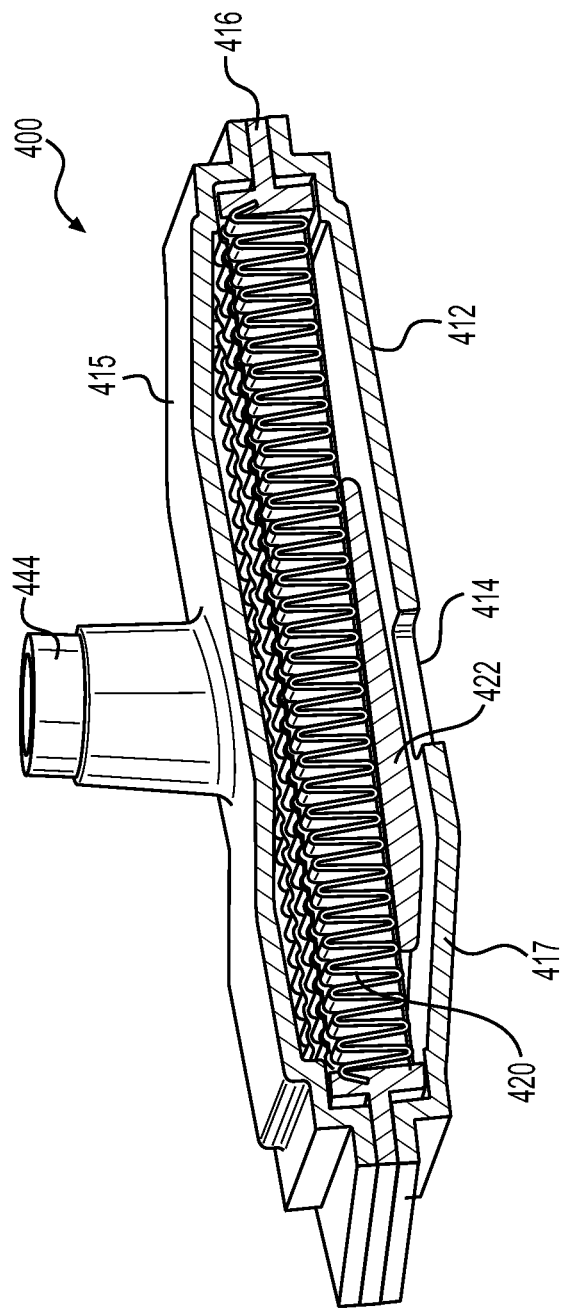
FIG. 14 is a cross-sectional view of a filter according to a fifth preferred embodiment.
Figure 15:
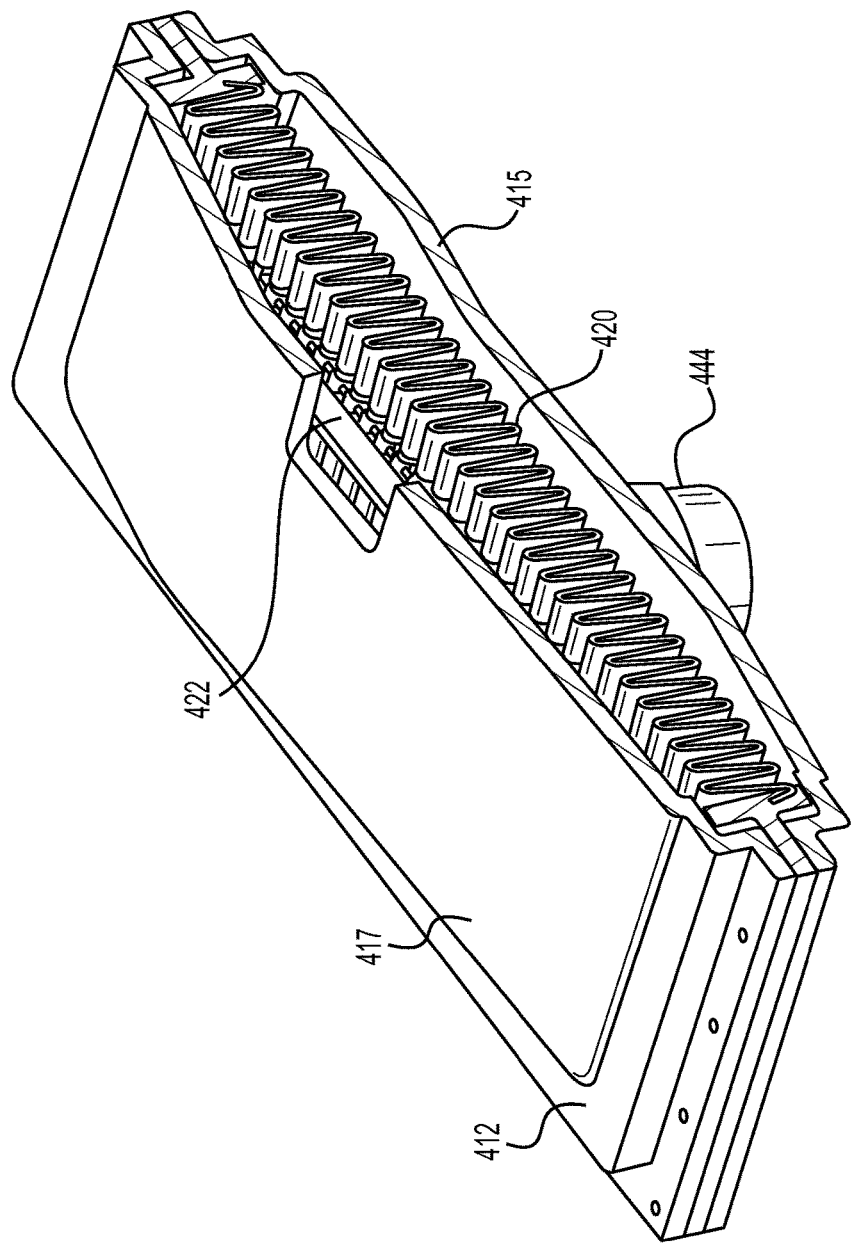
FIG. 15 is another cross-sectional view of the filter of FIG. 14.
Figure 16:
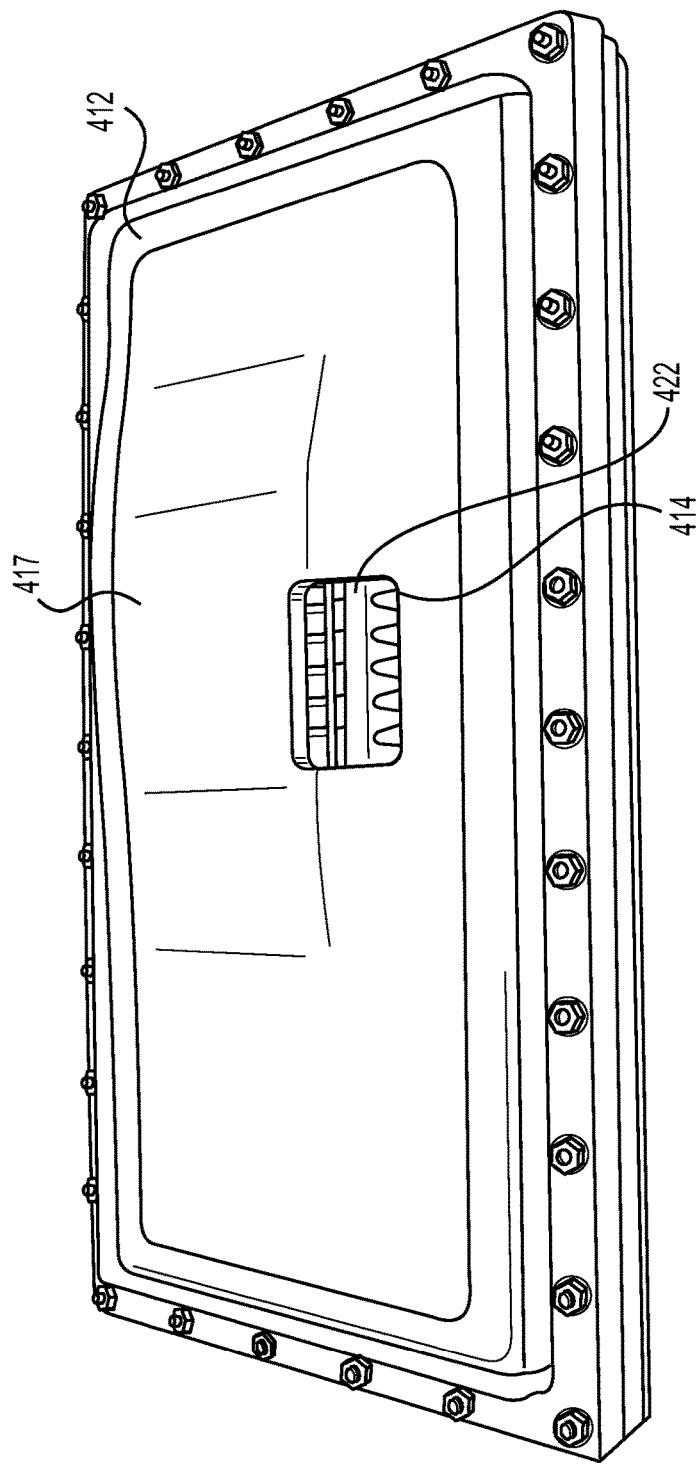
FIG. 16 is a bottom view of the filter of FIG. 14.
Figure 17:
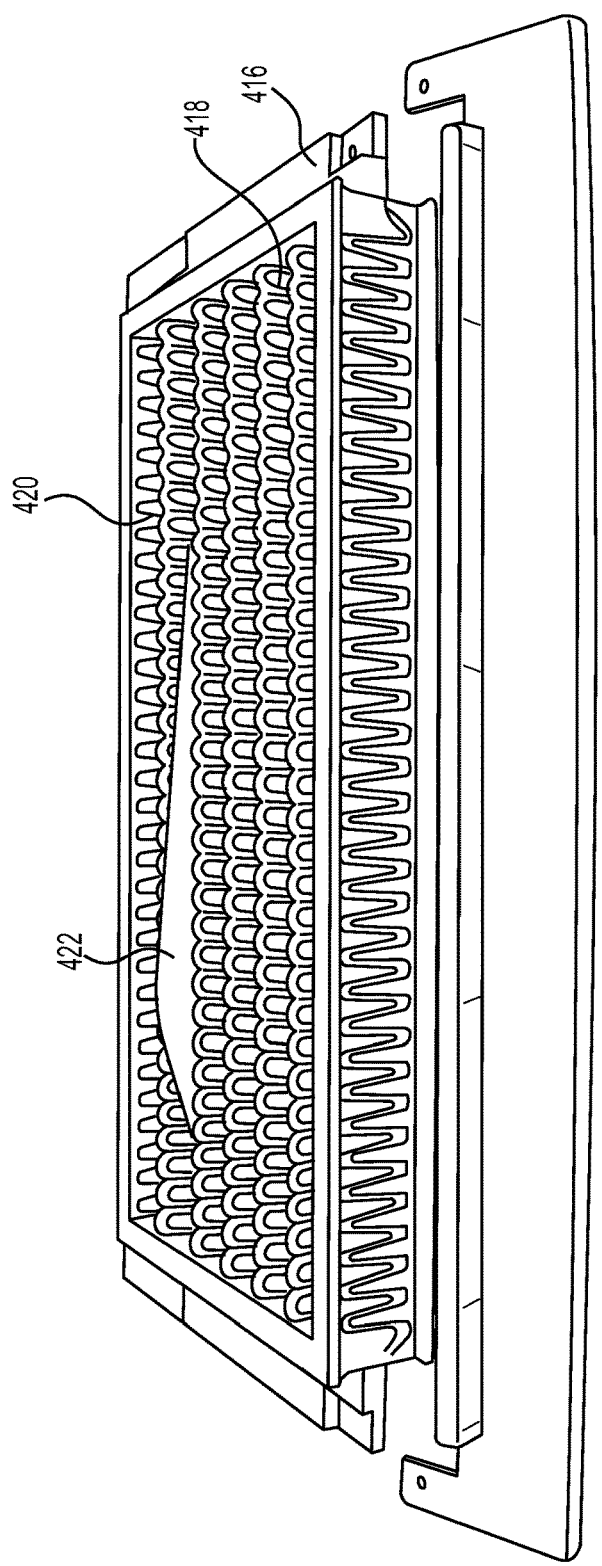
FIG. 17 is a view of a pleat pack used in the filter of FIG. 14.
Figure 18:
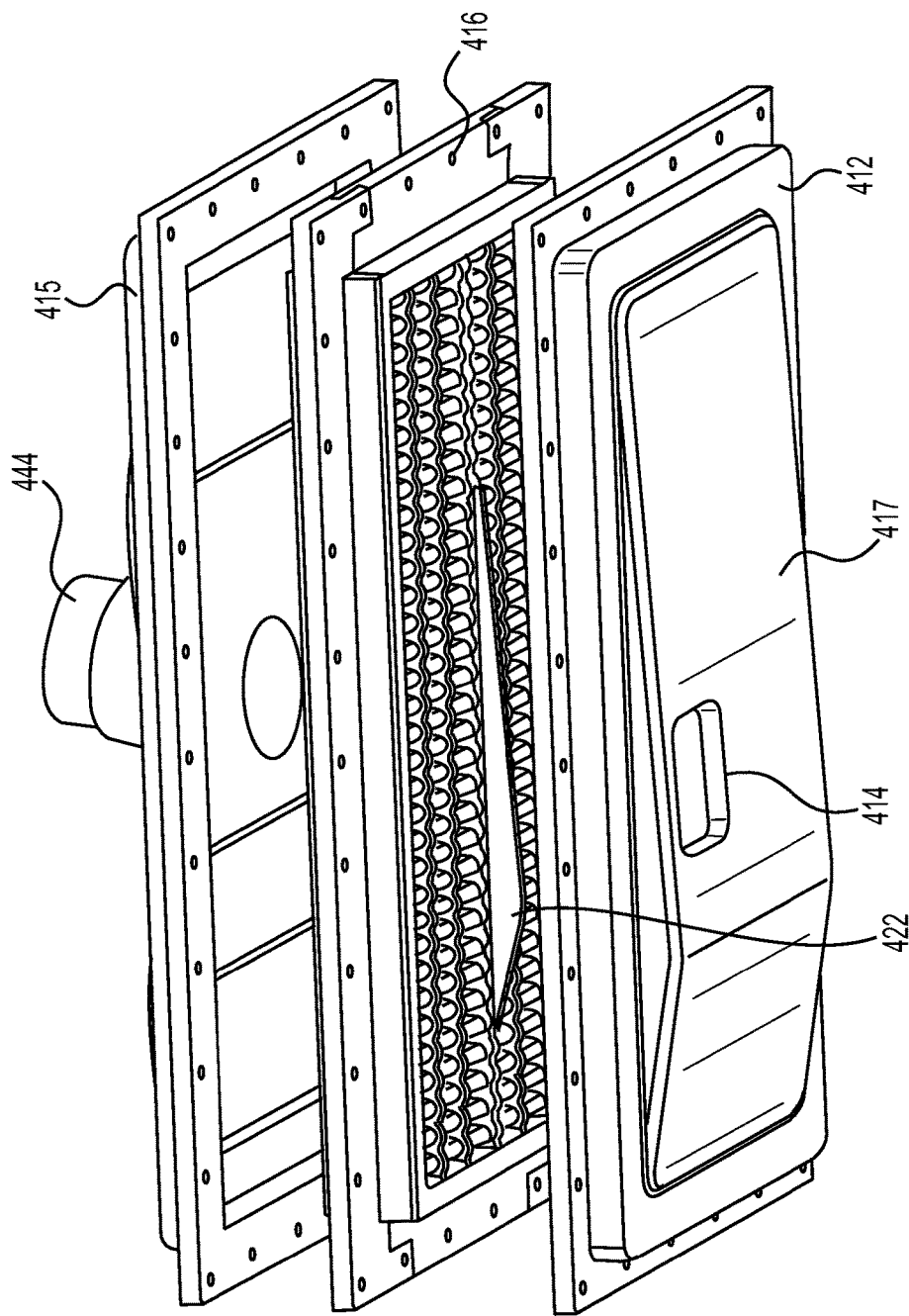
FIG. 18 is an exploded view of the filter of FIG. 14.
Figure 19:
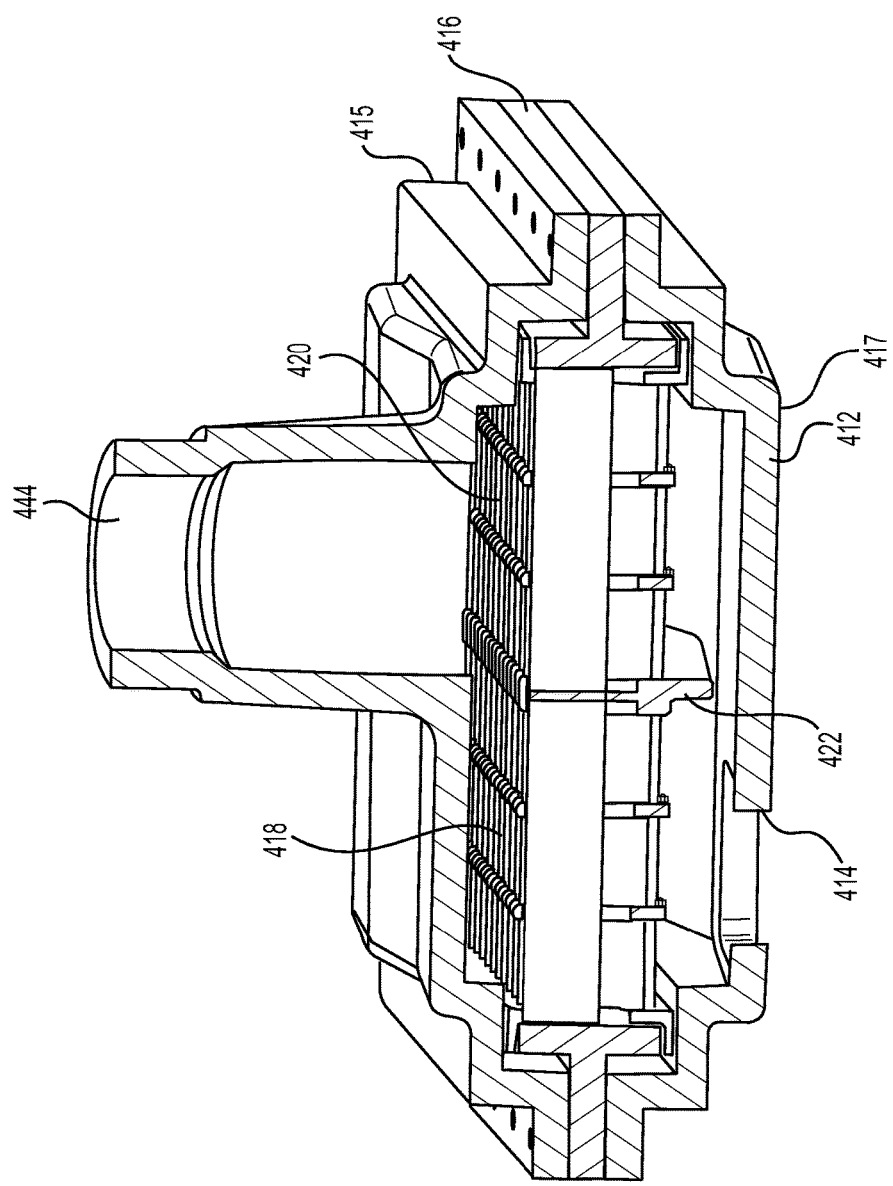
FIG. 19 is another cross sectional view of the filter of FIG. 14.

FIG. 14 is a cross-sectional view of a filter 400 according to a fifth preferred embodiment. FIG. 15 is another cross-sectional view of the filter of FIG. 14. FIG. 16 is a bottom view of the filter of FIG. 14. FIG. 17 is a view of a pleat pack used in the filter of FIG. 14. FIG. 18 is an exploded view of the filter of FIG. 14. FIG. 19 is another cross sectional view of the filter of FIG. 14. The filter includes a lower cover 412 having an inlet 414 and an upper cover 415 having an outlet 444. A pleat pack 416 has two media regions 418 and 420. A rib of the pleat pack 416 has a projecting passive flow control element 422 in the form of a blade shape. The blade 422 projects downwardly and is complementary with a V-shaped trough region 417 of the lower cover 412. Depending on the various flow control characteristics of the fluid, described above with respect to the other embodiments, the fluid entering the inlet will have a first flow path through the first media 418, as best illustrated in FIG. 19. This first flow path is fluid that is essentially blocked by the blade 422. A second flow path is formed where fluid flows around the sides of the blade 422 and thus passes around the blade and through the second media 420. The ratio of relative volume through each flow path will vary based on geometry and size of the blade, and on the fluid characteristics described above with respect to the other embodiments, for example the relative media areas, and the relative pressure drops of the medias.

It will be appreciated that some embodiments provide a filter system that provides control of the ratio or proportion of fluid that passes through a first media as compared to the ratio or proportion that passes through a second media. This control phenomenon may dynamically vary depending on factors such as for example, fluid supply flow rate and/or supply pressure and/or viscosity of the fluid and/or temperature of the fluid. Some embodiments provide types of active biased flow control element that deflect, and some other embodiments provide types of passive flow control elements in the form of apertures such as gaps, slots or circular or otherwise shaped holes in a flow control plate or other flow control structure. In some embodiments the flow control element is thermally activated in that change in temperature of fluid affects fluid viscosity which changes the proportion of fluid flow through the respective filter media. Alternatively, or in addition, the flow control element could change its shape, properties, or behavior with temperature, hence effecting flow properties through the media.

From the above description and drawings, it will be appreciated that several embodiments are shown with various types of flow control element disposed in the flow path on the outlet side of the pleat pack, and one embodiment is shown with a type of flow control element on the inlet side. However, it will also be clear that any type of flow control element can be provided on either the inlet side and/or the outlet side flow path. That is, an active element and/or a passive element can be placed on either side of the pleat pack, either towards the inlet side or the outlet side.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A fluid filter apparatus comprising:
an upper housing shell;
a lower housing shell;
an inlet;
an outlet; and
a pleat pack element comprising a peripheral frame, the peripheral frame comprising a first set of opposing sides and a second set of opposing sides, a first pleated media, a second pleated media, and a flow control element;
wherein:
at least two of the upper housing shell, the lower housing shell, and the peripheral frame are joined to one another to define a chamber, with the first and second pleated media disposed within the chamber;
the peripheral frame comprises a mounting location for said flow control element, the mounting location comprising first and second sidewalls that each comprise an inward facing side and an outward facing side, and which are each coupled to and extend transversely between the first set of opposing sides of the peripheral frame, such that the inward and outward facing sides of the first and second sidewalls extend parallel or substantially parallel to the second set of opposing sides, with the inward facing side of first sidewall facing the inward facing side of the second sidewall;
the first and second pleated media each extend transversely between the first set of opposing sides of the peripheral frame, such that the first pleated media is disposed between the outward facing side of the first sidewall and one of the first opposing sides of the peripheral frame, and the second pleated media is disposed between the outward facing side of the second sidewall and another of the first opposing sides; and
the flow control element is installed within the mounting location and comprises a blade that extends transversely between the first set of opposing sides, such that a first gap is present between the blade and the inward facing side of the first sidewall of the mounting location, and a second gap is present between the blade and the inward facing side of the second sidewall of the mounting location.

2. The fluid filter apparatus of claim 1, wherein:
the mounting location comprises a groove;
the flow control element comprises a lower lobe; and
the groove is configured to receive the lower lobe of the flow control element.

3. The fluid filter apparatus of claim 1, wherein the blade comprises a slot.

4. The fluid filter apparatus of claim 1, wherein the peripheral frame is at least partially molded over at least some edges of the first and second pleated media.

5. The fluid filter apparatus of claim 1, further comprising a supplemental filter material disposed separate from the pleat pack element, the supplemental filter material having a media density that is different than the density of first and second pleated media.

6. The fluid filter apparatus of claim 5, wherein the supplemental filter material comprises at least one aperture therethrough.

7. The fluid filter apparatus of claim 5, wherein the supplemental filter material is disposed adjacent to the pleat pack and in the direction of fluid flow before the pleat pack.

8. The fluid filter apparatus of claim 1, wherein the first and second pleated media have different filtration densities.

9. The fluid filter apparatus of claim 1, wherein the upper housing shell and lower housing shell are joined to the peripheral frame by one of vibration welding, laser welding, bonding, ultrasonic welding or infrared welding.

10. The fluid filter apparatus of claim 1, wherein the flow control element is a flexible resilient member.

11. The fluid filter apparatus of claim 1, wherein the flow control element comprises a plurality of apertures.

12. The fluid filter apparatus of claim 1, wherein the first and second pleated media comprise first and second folds, respectively, wherein said first and second folds extend transversely between the first set of opposing sides of the peripheral frame, and parallel or substantially parallel to the second set of opposing sides of the peripheral frame.

13. The fluid filter apparatus of claim 1, wherein the flow control element changes the proportion of flow between the first media and the second media responsive to changes in at least one of temperature, pressure, flow rate and/or viscosity of the fluid.

14. The fluid filter apparatus of claim 2, wherein the groove is configured to form a seal with the lower lobe of the flow control element.

15. The fluid filter apparatus of claim 2, wherein the groove comprises at least one lip that is configured to orient the blade towards the inward facing side of the first sidewall or the inward facing side of the second sidewall.

16. The fluid filter apparatus of claim 1, further comprising one or more ribs overmolded onto the first pleated media, the second pleated media, or both the first and second pleated media.

17. The fluid filter apparatus of claim 16, wherein said one or more ribs extend transversely between the first set of opposing sides of the peripheral frame.

* * * * *